United States Patent
Su et al.

(10) Patent No.: US 7,631,127 B2
(45) Date of Patent: Dec. 8, 2009

(54) METHODS AND SYSTEMS FOR VARYING BUS FREQUENCIES

(75) Inventors: Yao-Chun Su, Taipei (TW); I Lin Hsieh, Taipei (TW)

(73) Assignee: Via Technologies, Taipei (TW)

( * ) Notice: Subject to any disclaimer, the term of this patent is extended or adjusted under 35 U.S.C. 154(b) by 213 days.

(21) Appl. No.: 11/764,167

(22) Filed: Jun. 15, 2007

(65) Prior Publication Data
US 2008/0310524 A1    Dec. 18, 2008

(51) Int. Cl.
*G06F 13/42* (2006.01)
*H04K 1/10* (2006.01)
(52) U.S. Cl. ...................... 710/105; 375/260
(58) Field of Classification Search .............. 710/105; 375/260
See application file for complete search history.

(56) References Cited

U.S. PATENT DOCUMENTS

| 2007/0083782 A1* | 4/2007 | Ping ........................ 713/320 |
| 2007/0139898 A1* | 6/2007 | Yang ........................ 361/760 |
| 2007/0162734 A1* | 7/2007 | Noguchi .................... 713/1 |

* cited by examiner

*Primary Examiner*—Mark Rinehart
*Assistant Examiner*—Christopher A Daley
(74) *Attorney, Agent, or Firm*—Finnegan, Henderson, Farabow, Garrett & Dunner LLP

(57) ABSTRACT

The present invention provides a method for receiving an instruction for varying the bus frequency from a current bus frequency to a new frequency. The method may include storing a group of parameters corresponding to a second frequency, disabling a link connected to the host bus at a first frequency while the host bus is being operated with parameters corresponding to the first frequency, updating the parameters for operating the host bus with the group of parameters, and enabling the link at the second bus frequency to operate the host bus with the group of parameters.

12 Claims, 2 Drawing Sheets

METHODS AND SYSTEMS FOR VARYING BUS FREQUENCIES

BACKGROUND OF THE INVENTION

The present invention generally relates to methods and systems of operating a host bus and, more particularly, to methods and systems for varying bus frequencies and parameters.

A bus provides for signal communications between electronic devices. In a computer system, the central processing unit and the chipset are connected via a host bus, such as Front Side Bus (FSB) or Hyper Transport (HT). Hyper Transport improves the communication link or links between interconnected processors, supporting chips, and/or I/O devices and provides high speed, high performance, and/or point-to-point links in networking, communications, and other embedded applications. The possible advantages of a flexible, extensible, and/or simple bus structure make it a broadly adopted design today.

Personal computers are constantly evolving to provide users with higher performance at lower cost. However, power consumption usually is balanced against performance and demands of various applications. For example, for portable systems such as laptop computers and personal digital assistants (PDAs), power consumption may be a variable factor. When there are more processing tasks or needs for a higher processing speed, a bus-operating frequency may be increased at the cost of more power consumption. Concurrently, bus chains coupled between interconnected processors and devices may also be operated at a higher frequency. For example, the frequency of the bus connecting the processor and memories may be increased when a higher speed of reading/writing data from/to memory is needed.

Because the host bus frequency may be varied to save power or to increase performance, parameters corresponding to the bus frequency, such as the I/O drive strength, bus timing, and loading on bus, should be updated with such a change of the bus frequency. The bus frequency of the host bus and the corresponding parameters may be changed by the following operation. First, parameters corresponding to the current frequency are updated to new parameters associated with a new frequency. Next, a link connected to the host bus at the current frequency is disabled. The link is then reconnected at the new frequency to operate the host bus at the new frequency with the new parameters. FIG. 1 illustrates a conventional solution, including the above steps for changing the bus frequency.

However, this approach may cause the bus to operate at an old frequency while using parameters corresponding to a new frequency before disabling the link. For example, the host bridge operation may fail if it operates at the old frequency with new parameters.

BRIEF SUMMARY OF THE INVENTION

One example of the present invention provides a method for varying a bus frequency. The method may include receiving an instruction for varying the bus frequency from a current bus frequency to a new frequency, storing a group of parameters corresponding to the second frequency, disabling a link connected to the host bus at the first frequency when the host bus is being operated with parameters corresponding to the first frequency, updating the parameters for operating the host bus with the group of parameters, and enabling the link at the second bus frequency to operate the host bus with the group of parameters.

Another example of the present invention provides a method for operating a bus. The method may include receiving an instruction for varying the bus frequency from a first frequency to a second frequency, storing an indicator for indicating the second frequency, disabling a link connected to the host bus at the first frequency when the host bus is being operated with parameters corresponding to the first frequency, selecting a group of parameters from the groups of parameters based on the indicator to identify the new parameters corresponding to the second frequency, and enabling the link at the second bus frequency to operate the host bus with the new parameters. The groups of parameters may be stored in a register or registers.

Still another example of the present invention provides a method for varying a bus frequency. The method may include receiving an instruction for varying the bus frequency from a first frequency to a second frequency, storing an indicator for indicating the second frequency, disabling the link connected to the host bus at the first frequency, wherein the host bus is being operated with parameters corresponding to the first frequency, selecting a group of parameters from the groups of parameters based on the indicator to obtain the new parameters corresponding to the second frequency, and enabling the link at the second bus frequency to operate the host bus with the new parameters. The groups of parameters may be stored in a read only memory (ROM).

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred.

In the drawings.

DETAILED DESCRIPTION OF THE INVENTION

Examples consistent with the present invention provide methods and systems for varying bus frequencies and corresponding operating parameters. In some examples, a method for varying the first bus frequency and updating the corresponding bus parameters may be implemented by operating a bus at current bus frequency with the corresponding bus parameters.

Figure 1:
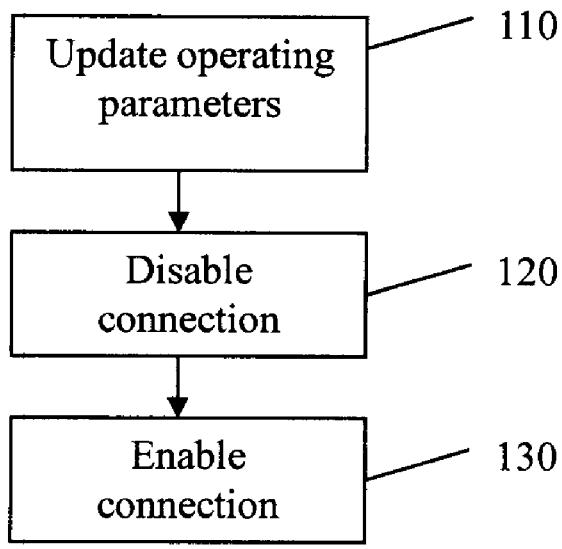
FIG. 1 is an exemplary flowchart of a method for varying the operating frequency and bus parameters in the prior art.
Figure 2:
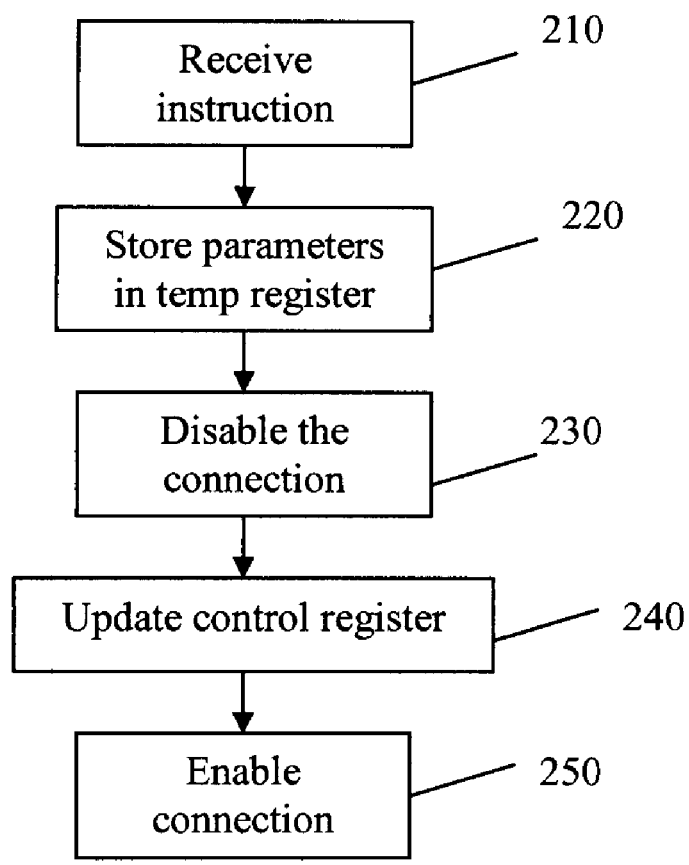
FIG. 2 is an exemplary flowchart of a method for varying a first bus frequency by updating a group of parameters corresponding to a second bus frequency in examples consistent with the present invention.

FIG. 2 illustrates an exemplary flow chart of a method for varying a first bus frequency. Referring to FIG. 2, an instruction is received at step 210 for varying the bus frequency from a first bus frequency to a second frequency. A group of parameters corresponding to the second frequency may be stored to a storage location, such as a set of registers or a memory, at step 220. A link connected to the host bus at the first bus frequency with the parameters corresponding to the first frequency may be disabled at step 230. Parameters in a control register may then be updated at step 240, and these parameters may be used for operating the host bus. The link may then be enabled at the second bus frequency to operate the host bus with the updated parameters at step 250. In some examples, the host bus may be a HyperTransport bus, and parameters corresponding to the second frequency or other frequencies may include operating parameters such as drive strength, timing delay, and bus loading.

In one example, two groups of registers may be configured. One group is called the "control register", and may include a set of registers for storing a group of current operating parameters corresponding to the first bus frequency. The other group is called the "temporary register", and may include a set of registers for storing a group of parameters corresponding to the second frequency. When an instruction of varying a bus frequency is received at step 210, a new group of parameters corresponding to the second bus frequency may be loaded to the temporary register at step 220. The parameters in the control register are not updated at this time, i.e., the parameters in the control register are still the parameters corresponding to the first bus frequency. Moreover, the disabling of the communication link is performed with the parameters in the control register. Therefore, the frequency used to disable the communication link matches the parameters stored in the control register. After the link is disabled successfully at step 230, the control register is updated with the new parameters corresponding to the second bus frequency at step 240. Consequently, the communication link is enabled with the new parameters stored in the control register at step 250, and these parameters correspond to the second bus frequency.

Figure 3:
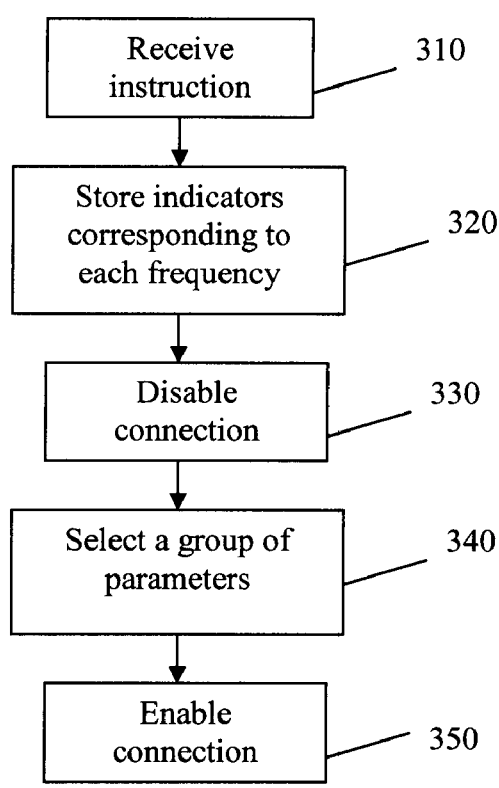
FIG. 3 is an exemplary flowchart of a method for varying a first bus frequency by selecting a group of parameters from groups of parameters stored in registers in examples consistent with the present invention.

FIG. 3 shows another exemplary method for varying the bus frequency in examples consistent with the invention. Referring to FIG. 3, an instruction for varying the bus frequency is received at step 310 to vary a bus frequency from a first bus frequency to a second frequency. An indicator may be stored at step 320 for indicating the second frequency and groups of parameters, wherein each group of parameters corresponds to a specific bus frequency. A link connected to the host bus at the first bus frequency with the parameters corresponding to the first frequency may be disabled at step 330. A group of parameters may be selected from the groups of parameters based on the indicator at step 340 to identify the new parameters corresponding to the second frequency. The link may then be enabled at step 350 at the second bus frequency to operate the host bus with the new parameters.

As described above, a set of registers may be configured for storing groups of parameters corresponding to each frequency the chipset supports. Once an instruction for varying a bus frequency is received at step 310, an indicator for indicating the second bus frequency may be stored at step 320. The indicator may be used to select a group of parameters corresponding to the second bus frequency from the groups of parameters stored in the configured registers. The register which stores the current operating parameters may not yet be updated. Therefore, the bus communication link may be disabled at the first bus frequency with the current operating parameters at step 330. The group of parameters corresponding to the second bus frequency may then be selected at step 340 based on the indicator. Consequently, the communication link may be enabled at step 350 at the second bus frequency to operate the host bus with the selected group of parameters. Then the group of parameters with which bus is operated matches the second bus frequency.

Figure 4:
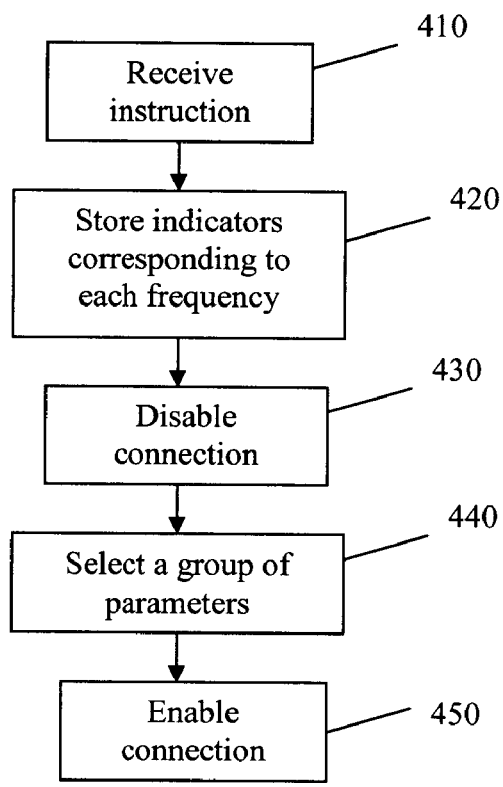
FIG. 4 is an exemplary flowchart of a method for varying a first bus frequency by selecting a group of parameters from groups of parameters stored in ROM in examples consistent with the present invention.

FIG. 4 shows another exemplary method for varying the bus frequency in examples consistent with the invention. Referring to FIG. 4, an instruction is received at step 410 for varying the bus frequency from a first frequency to a second frequency. An indicator may be stored at step 420 for indicating the second frequency and groups of parameters, wherein each group of parameters corresponds to a specific bus frequency. A link connected to the host bus may be disabled at step 430 at the first frequency with the parameters corresponding to the first frequency. A group of parameters may then be selected from the groups of parameters based on the indicator at step 440 to identify the new parameters corresponding to the second bus frequency. The link may then be enabled at step 450 with the second bus frequency to operate the host bus with the new parameters.

As illustrated, groups of parameters corresponding to each frequency that the chipset supports may be stored in a storage location, e.g., in a Read Only Memory (ROM). When the instruction for varying a bus frequency is received at step 410, an indicator for indicating the second bus frequency may be stored at step 420. The indicator may be used to select a group of parameters corresponding to the second bus frequency from the groups of parameters stored in ROM. The bus communication link may then be disabled successfully at step 430 at the first bus frequency with the current operating parameters since the current operating parameters stored in ROM may not yet be updated. Then the group of parameters corresponding to the second bus frequency may be selected at step 440 based on the indicator. Consequently, the communication link is enabled at step 450 at the second bus frequency to operate the host bus with the selected group of parameters corresponding to the second bus frequency.

A method of the present invention for varying a bus frequency of a host bus has been described in three embodiments in conjunction with FIGS. 2, 3 and 4. Each method in one of the three embodiments can be implemented by a controller in a system.

In a preferred embodiment of the system, the controller is configured to execute the steps in the method described in each embodiment. In particular, the controller is configured to receive an instruction for varying the bus frequency from a first frequency to a second frequency, to store information with respect to the second frequency, to disable a link connected to the host bus at the first frequency, wherein the host bus is being operated with parameters corresponding to the first frequency, to identify new parameters corresponding to the second frequency based on the stored information, and to enable the link at the second bus frequency to operate the host bus with the new parameters.

In describing representative examples of the present invention, the specification may have presented the method of the present invention as a particular sequence of steps. However, to the extent that the method does not rely on the particular order of steps set forth herein, the method should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method of the present invention should not be limited to the performance of their steps in the order written, and one skilled in the art can readily appreciate that the sequences may be varied and still remain within the spirit and scope of the present invention.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

What is claimed is:

1. A method for varying a bus frequency of a host bus, the host bus capable of operating at different frequencies, the method comprising:
   receiving an instruction for varying the bus frequency of the host bus from a first frequency to a second frequency, wherein parameters associated with the first frequency are stored in a first register;
   storing parameters associated with the second frequency in a second register while the host bus is operating at the first frequency;
   disabling a link connected to the host bus;
   storing the parameters associated with the second frequency in the first register while the link of the host bus is disabled;
   obtaining the second frequency from the parameters associated with the second frequency stored in the first register; and
   enabling the link of the host bus and operating the host bus at the second frequency.

2. The method as recited in claim 1, further comprising providing an indicator for indicating the second frequency.

3. The method as recited in claim 2, wherein the parameters are stored in Read Only Memory (ROM).

4. The method as recited in claim 1, wherein the parameters associated with the first frequency and parameters associated with the second frequency include at least one of a drive strength of bus, timing delay of bus, and loading on bus.

5. The method as recited in claim 1, wherein the host bus is HyperTransport bus.

6. A system, comprising:
   a host bus; and
   a controller, the controller configured to:
   receive an instruction for varying the host bus frequency from a first frequency to a second frequency, wherein parameters associated with the first frequency are stored in a first register;
   store parameters associated with the second frequency to a second register while the host bus is operating at the first frequency;
   disable a link connected to the host bus;
   store the parameters associated with the second frequency in the first register while the link of the host bus is disabled;
   obtain the second frequency from the parameters stored in the first register; and
   enable the link of the host bus and operating the host bus at the second frequency.

7. The system as recited in claim 6, wherein the controller further provides an indicator for indicating the second frequency.

8. The system as recited in claim 7, wherein the system comprises at least one register.

9. The system as recited in claim 7, wherein the system comprises a Read Only Memory (ROM).

10. The system as recited in claim 6, wherein the parameters associated with the first frequency and parameters associated with the second frequency include at least one of a drive strength of bus, timing delay of bus and loading on bus.

11. The system as recited in claim 6, wherein the host bus comprises a HyperTransport bus.

12. A system comprising:
   a bus;
   a first register configured to store a first set of parameters associated with operating the bus at a first frequency;
   a second register configured to store a second set of parameters associated with operating the bus at a second frequency; and
   a controller coupled to the bus and the first and the second registers, the controller being configured to vary the operating frequency of the bus from the first frequency to the second frequency by transferring the second set of parameters stored in the second register to the first register,
   wherein the second set of parameters is stored in the second register while the bus is operated at the first frequency, then the second set of parameters are stored in the first register while a link of the bus is disabled, and the bus is operated at the second frequency after the link is enabled.

* * * * *